D. ELLIS.
FISHING LINE REEL.

No. 43,485. Patented July 12, 1864.

Witnesses:
Augustus Smith
R. Fitzgerald

Inventor:
D. Ellis

UNITED STATES PATENT OFFICE.

DARWIN ELLIS, OF WATERBURY, CONNECTICUT.

IMPROVEMENT IN FISHING-LINE REELS.

Specification forming part of Letters Patent No. 43,485, dated July 12, 1864.

*To all whom it may concern:*

Be it known that I, DARWIN ELLIS, of the city of Waterbury, in the county of New Haven and State of Connecticut, have invented a new and useful Improvement in Fishing-Reels; and I do hereby declare that the following is a full, clear, and exact description of the construction, character, and operation of the same, reference being had to the accompanying drawings, which make part of this specification, in which—

Figure 1:
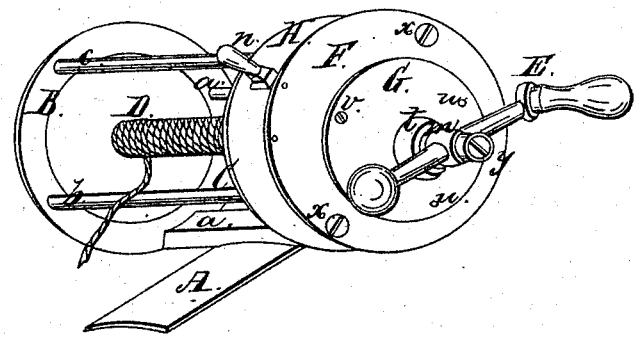
Figure 2:
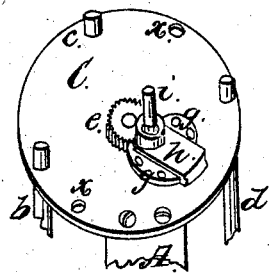
Figure 4:
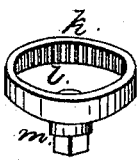
Figure 3:
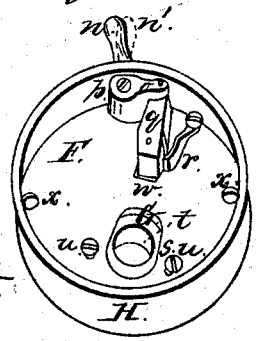

Figure 1 is a perspective view of the reel ready for sale or use. Fig. 2 is a perspective view of a portion of the reel with the cap removed, showing the pinion on the line-arbor and the dovetail slide with its stud, &c. Fig. 3 is a perspective of the inside of the cap, showing the elbow-shaped lever or bell-crank which throws the wheel into and out of gear with the pinion, &c. Fig. 4 is a perspective view of the crank-wheel with its inverted teeth, which is to be thrown into gear with the pinion when it is desired to reel in the line, &c.

My improvement consists in constructing the reel in such a manner that, by means of an elbow-shaped lever or bell-crank, I am able to throw the crank-wheel out of gear with the pinion on the line-arbor, so that the fish may be permitted to run with the line with entire freedom, and without turning the crank, and yet at any moment to throw the wheel into gear with the pinion and reel in the line at pleasure, and in making the number of inverted teeth in the crank-wheel several times more numerous than those in the pinion, so that in reeling in the line-arbor will be revolved several times more rapidly than the crank, and thus reel in the line with great rapidity when desired.

I make the frame of the reel of two circular plates, B and C, of brass or any other suitable material, (with a suitably-curved plate, A, at right angles to the line-arbor, by which it is to be attached to the fishing-pole,) and three or more rods or bars, as *a b c d*, to hold the disks or plates B and C at their proper distance from each other, all as shown in Fig. 1 and in part in Fig. 2.

I make the line-arbor of a cylindrical piece of brass or any other suitable material, (either solid or hollow,) with suitable disks secured on the ends to protect the line, and place its journals in proper bearings in the centers of the two disks B and C, as shown at D in Fig. 1 and indicated at *e*, Fig. 2.

On the outer end of one of the journals I key a pinion, as shown at *e*, Fig. 2, by which this line-arbor may be revolved to reel up the line when desired.

Eccentric on the disk C, I secure dovetail guides *g g*, and I fit a dovetail block, *h*, to slide between those guides *g g*, to carry a movable stud, *i*, all as shown in Fig. 2.

I make the crank-wheel, Fig. 4, with the teeth inverted, or on the inner side of the periphery, as seen at *k*, a disk, *l*, and a pipe, tube, or socket, *m*, all as shown in Fig. 4.

I make a cap of a disk, F, and collar H, of brass or any other suitable material, to cover the outer side of the disk C, as shown in Fig. 3. Through the periphery or collar H of this cap I have an elbow-shaped lever or bell-crank, *n o*, secured to the disk F by a screw, as seen, near *p*. The inner arm, *o*, of this bell-crank I joint to a movable block, *q*, which block is held steady in either of its positions by a spring-click, *r*, which (by its own elasticity) is forced into one or the other of the two notches in the side of the block *q*, and toward the lower side of the disk F, I cut an oblong space, *s*, all as shown in Fig. 3, and also a square mortise, in which the block *q* slides, as shown, in part, at *w*, Fig. 3.

On the outer side of the disk F of the cap, Fig. 3, I secure a disk, G, with a projecting collar, *t*, to receive the tubular part *m* of the crank-wheel, Fig. 4. I secure this disk G to the disk F by means of two screws, *u u*, which work in slots, as shown in Fig. 3, so that the disk G may be moved up and down at pleasure. I secure this disk G to the block *q*, Fig. 3, by means of a screw, *v*, Fig. 1, passing through a slot, *w*, Fig. 3, in the disk F, in which a part of the block *q* slides, as above described.

On the square part of the socket *m* of the crank-wheel, Fig. 4, I secure a suitable crank, as shown at E, Fig. 1, by a screw, *y*, or otherwise, as found convenient.

Having made the frame and the several working parts, as before described, I key the pinion *e* onto the end of the line-arbor D, and slide the block *h* between the guides *g g*, as seen in Fig. 2. I then invert the crank-wheel, Fig. 4, and pass it onto the stud $i$, and place the cap, Fig. 3, with its attachments, over the disk C, with the stud $i$, Fig. 2, and the socket $m$, Fig. 4, protruding through the oblong space $s$, Fig. 3, in the disk F and through the collar $t$ of the disk G, and secure the cap, Fig. 3, in its place by screws $x\,x$ and slip on the crank E, and secure it by the binding-screw $y$, when the whole will appear as represented in Fig. 1, and will be ready to be attached to a fishing-pole for use.

When I wish to move the crank-wheel, Fig. 4, out of gear with the pinion $e$, Fig. 2, I force the outer arm, $n$, of the elbow-shaped lever to the position shown at $n$, Fig. 3, so that the block $q$, with the disk G, crank-wheel, &c., will be drawn up so far that the spring-click $r$ will rest in the lower notch of the block $q$, as seen in Fig. 3, and the crank-wheel, Fig. 4, will be out of gear with the pinion $e$, Fig. 2, and so that the line arbor may revolve freely without turning the crank, so that I may give any length of line to the fish; but when I wish to reel in I force the outer arm, $n$, of the elbow-shaped lever to the position shown in red dots at $n'$, Fig. 2, which will force the block $q$ downward, so that the spring-click $r$ will rest in the upper notch in the block $q$, and so that the disk G, with its collar $t$, will be carried downward sufficiently to bring the crank-wheel, Fig. 4, into gear with the pinion $e$, Fig. 2, when the line may be reeled in at pleasure.

I am aware that the use of the elbow-shaped lever or bell-crank for throwing machinery into and out of gear is not new, and that gearing up machinery is in common practice. I therefore do not claim either of them as such; but

What I claim as my invention, and desire to secure by Letters Patent, is—

The combination of the elbow-shaped lever and its appendages with the wheel, Fig. 4, and pinion $e$ when the whole is constructed, combined, and fitted to produce the desired result, substantially as herein described.

D. ELLIS.

Witnesses:
R. FITZGERALD,
AUGUSTUS SMITH.